United States Patent
Inagaki et al.

(10) Patent No.: US 10,076,957 B2
(45) Date of Patent: Sep. 18, 2018

(54) ASSEMBLY STRUCTURE OF CLUSTER PANEL INTEGRATED WITH ONBOARD EQUIPMENT

(71) Applicants: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(72) Inventors: Yuya Inagaki, Kariya (JP); Toshinao Wada, Toyota (JP)

(73) Assignees: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 9 days.

(21) Appl. No.: 15/371,441

(22) Filed: Dec. 7, 2016

(65) Prior Publication Data

US 2017/0166059 A1 Jun. 15, 2017

(30) Foreign Application Priority Data

Dec. 9, 2015 (JP) .................................. 2015-240080

(51) Int. Cl.
*B60K 37/02* (2006.01)
*B60R 11/02* (2006.01)
*B60R 11/00* (2006.01)

(52) U.S. Cl.
CPC .......... *B60K 37/02* (2013.01); *B60R 11/0229* (2013.01); *B60R 11/0258* (2013.01);
(Continued)

(58) Field of Classification Search
CPC ............ B60R 11/0229; B60R 11/0258; B60R 11/0264; B60R 11/0205;
(Continued)

(56) References Cited

U.S. PATENT DOCUMENTS 5,479,693 A 1/1996 Oyama

FOREIGN PATENT DOCUMENTS

JP S54-160726 U 11/1979
JP 06-183287 A 7/1994
(Continued)

OTHER PUBLICATIONS

Partial Translation of communication dated Nov. 14, 2017 issued by the Japanese Patent Office in counterpart Japanese Application No. 2015-240080.

*Primary Examiner* — Dennis H Pedder
(74) *Attorney, Agent, or Firm* — Sughrue Mion, PLLC

(57) ABSTRACT

An assembly structure for assembling the cluster panel with a vehicle body, the cluster panel being integrated with onboard equipment, the vehicle body including a receiving portion that can receive the onboard equipment integrated with the cluster panel, and a sliding surface disposed below the receiving portion, the sliding surface extending for a prescribed length from a position on a vehicle interior side to a position on a farther side of the receiving portion; and the onboard equipment including a sliding contact portion that can come in sliding contact with the sliding surface when the onboard equipment integrated with the cluster panel is put into and taken out from the receiving portion.

5 Claims, 11 Drawing Sheets

(52) U.S. Cl.
CPC .. *B60R 11/0264* (2013.01); *B60K 2350/1028* (2013.01); *B60K 2350/941* (2013.01); *B60R 11/0205* (2013.01); *B60R 2011/0005* (2013.01); *B60R 2011/0071* (2013.01); *B60R 2011/0075* (2013.01)

(58) Field of Classification Search
CPC ..... B60R 2011/0005; B60R 2011/0071; B60R 2011/0075; B60K 37/02; B60K 2350/941; B60K 2350/1028
USPC .............................. 296/70; 180/90; 248/27.1
See application file for complete search history.

(56) References Cited

FOREIGN PATENT DOCUMENTS

| | | |
|---|---|---|
| JP | 2005-082133 A | 3/2005 |
| JP | 2011-111146 A | 6/2011 |

FIG.4
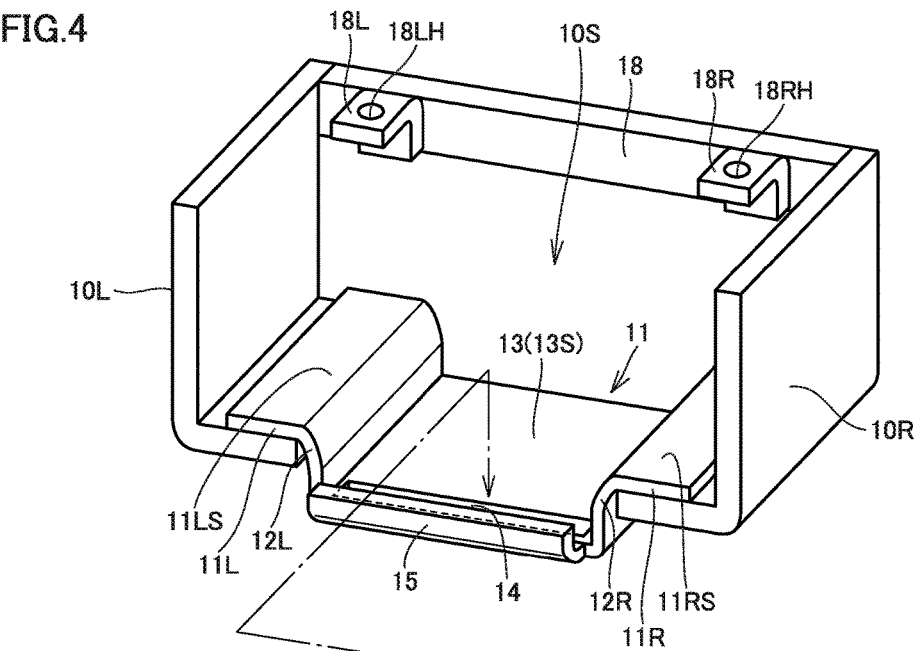
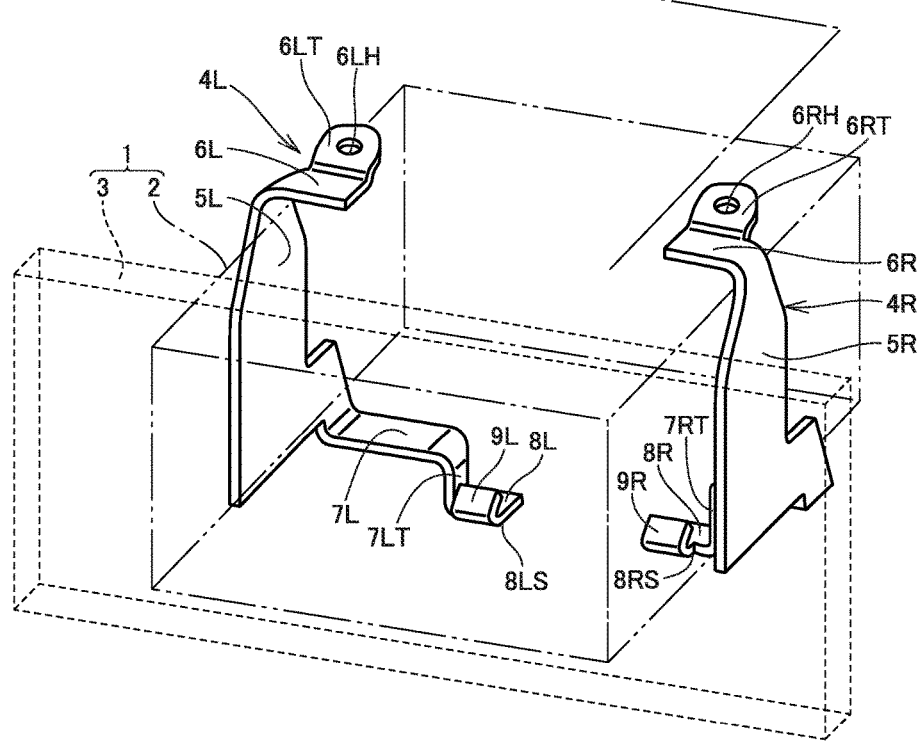

FIG.5
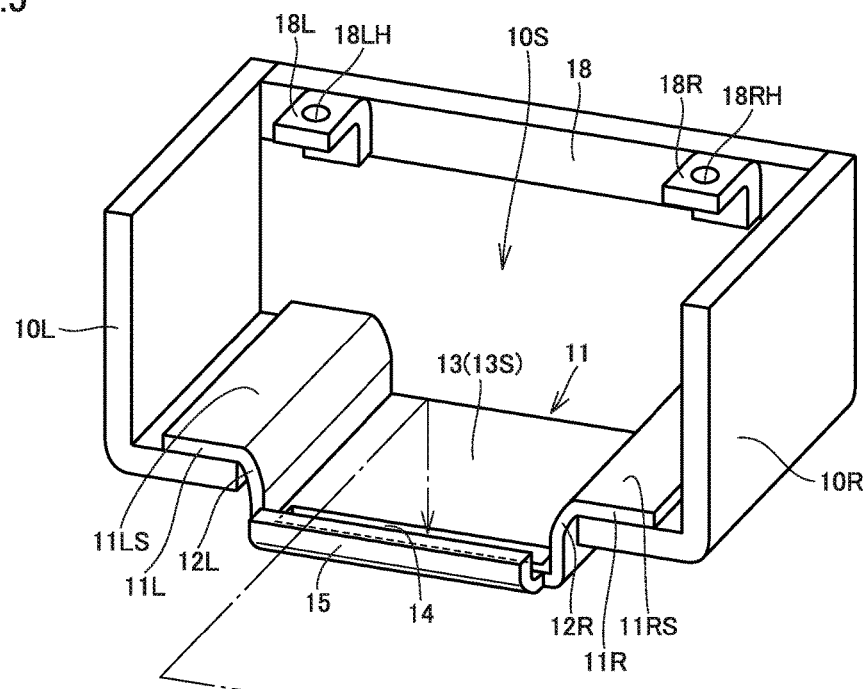
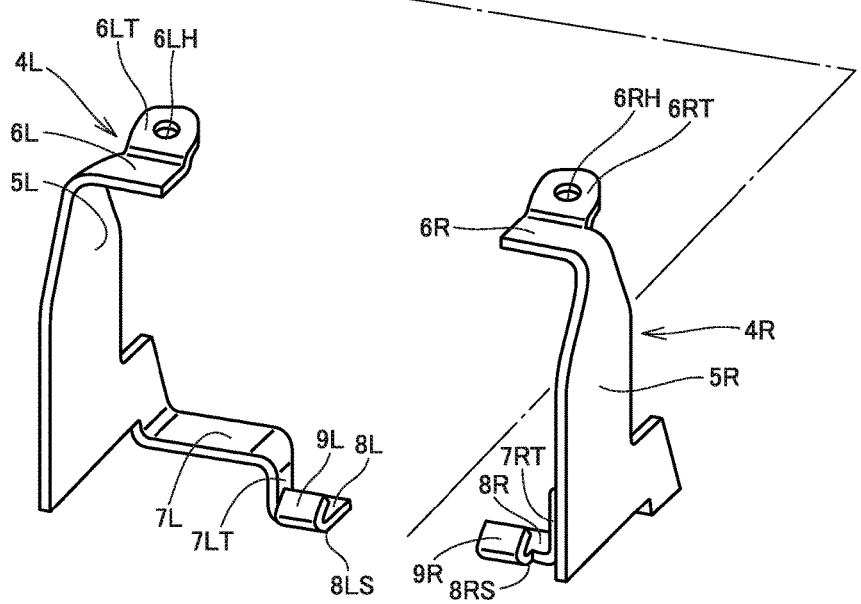

ASSEMBLY STRUCTURE OF CLUSTER PANEL INTEGRATED WITH ONBOARD EQUIPMENT

This nonprovisional application is based on Japanese Patent Application No. 2015-240080 filed on Dec. 9, 2015 with the Japan Patent Office, the entire contents of which are hereby incorporated by reference.

BACKGROUND OF THE INVENTION

Field of the Invention

The present invention relates to an assembly structure of a cluster panel integrated with onboard equipment for assembling the cluster panel, which is integrated with onboard equipment, with a vehicle body.

Description of the Background Art

As disclosed in Japanese Patent Laying-Open Nos. 2005-082133 and 06-183287, a structure to assemble onboard equipment with a vehicle body is known. Examples of onboard equipment include audio equipment, a navigational device, and a device for operation of an air conditioner (e.g. an air conditioning control panel or heater control panel).

SUMMARY OF THE INVENTION

Regarding a cluster panel disposed in the front part in a vehicle compartment, an improvement in design can be achieved by forming a cluster panel with no parting line (component parting line) and by making the cluster panel as large as possible. In a case where a large cluster panel that is integrated with onboard equipment is integrally assembled with a vehicle body, the assembly process may become difficult due to the large size and weight of the installation object, namely the cluster panel and the onboard equipment.

An object of the present invention is to provide an assembly structure of a cluster panel integrated with onboard equipment that allows easy assembly of the cluster panel, which is integrated with onboard equipment, with a vehicle body.

An assembly structure according to the present invention is an assembly structure for assembling a cluster panel with a vehicle body, the cluster panel being integrated with onboard equipment, the vehicle body including a receiving portion that can receive the onboard equipment integrated with the cluster panel, and a sliding surface disposed below the receiving portion, the sliding surface extending for a prescribed length from a position on a vehicle interior side to a position on a farther side of the receiving portion; and the onboard equipment including a sliding contact portion that can come in sliding contact with the sliding surface when the onboard equipment integrated with the cluster panel is put into and taken out from the receiving portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a perspective view, seen from diagonally above in a vehicle compartment, showing a situation where the installation object is assembled with the receiving portion of the vehicle body in the assembly structure shown in FIG. 1.

FIG. 5 is a perspective view for explaining a situation where brackets are assembled with the receiving portion in the assembly structure shown in FIG. 1, FIG. 5 corresponding to the perspective view of FIG. 4 except that the onboard equipment and the cluster panel are not shown therein.

DESCRIPTION OF THE PREFERRED EMBODIMENTS

Figure 1:
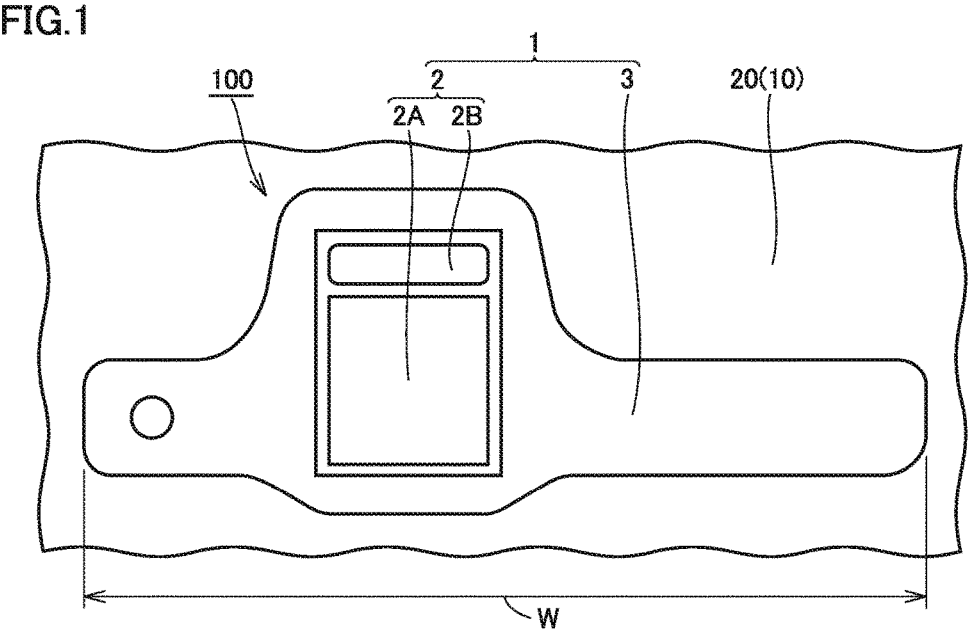
FIG. 1 shows the appearance of an assembly structure of a cluster panel integrated with onboard equipment, seen from the front, in an embodiment.

Hereinafter reference will be made to the drawings to describe an embodiment. Identical components and equivalent components are identically denoted, and redundant explanations are not repeated in some cases. FIG. 1 shows the appearance of an assembly structure 100 of a cluster panel integrated with onboard equipment, seen from the front, in the embodiment.

As shown in FIG. 1, a vehicle body 10 is provided with an instrument panel 20 at the front part in the vehicle compartment. In the assembly structure 100 of the cluster panel integrated with the onboard equipment, the instrument panel 20 has an opening (not shown) and a cluster panel 3 is assembled with the vehicle body in such a manner as to cover the opening.

Figure 2:
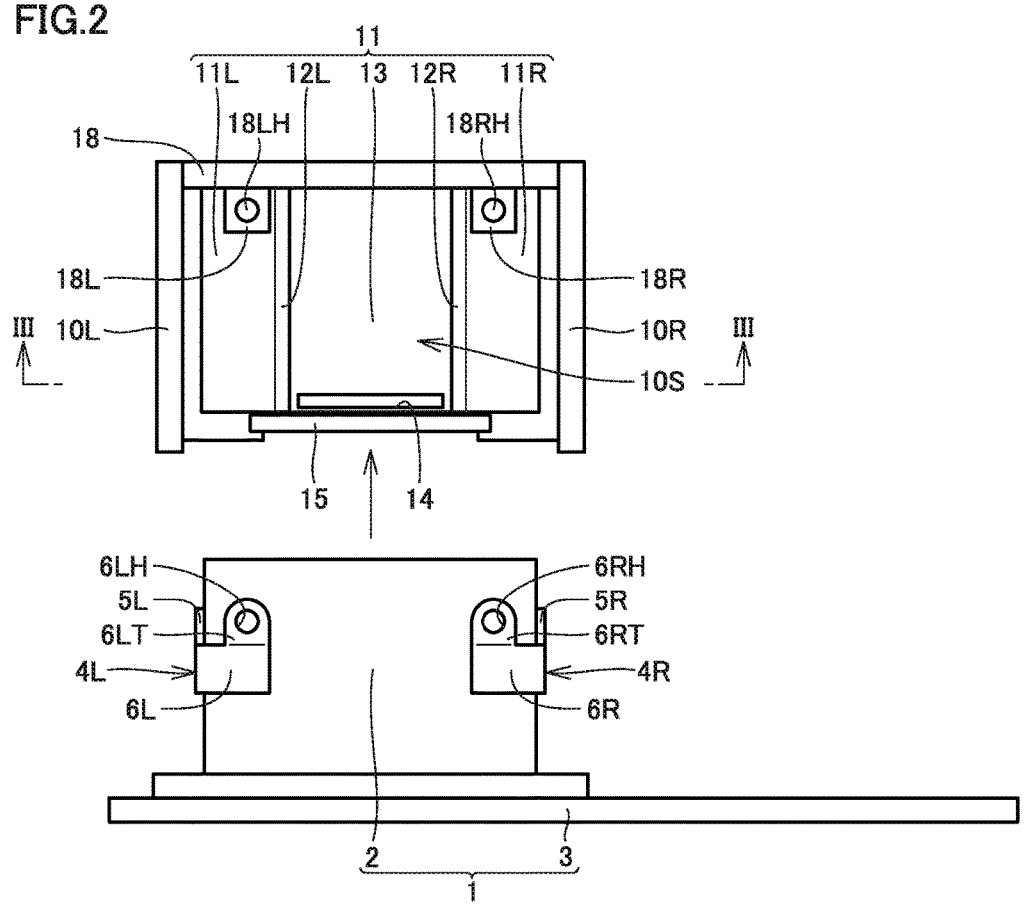
FIG. 2 shows a situation, seen from above, where an installation object is assembled with a receiving portion of a vehicle body in the assembly structure shown in FIG. 1.

In the present embodiment, the cluster panel 3 and the onboard equipment 2 are integrated with each other as an installation object 1, and the installation object 1 is assembled with the vehicle body (a receiving portion 10S) (see FIG. 2). The onboard equipment 2 in the present embodiment includes a touch panel display 2A and an air conditioning control panel 2B for operation of an air conditioner.

The dimension W in the vehicle width direction of the installation object 1, which is formed of the cluster panel 3 and the onboard equipment 2 integrated with each other, is, for example, 900 mm and the entire weight of the installation object 1 is, for example, 7 kg. The cluster panel 3 does not have so-called parting lines (component parting lines) on its surface and has the onboard equipment 2 integrated with the cluster panel 3. Accordingly, the cluster panel 3 is advantageous in terms of design.

Figure 3:
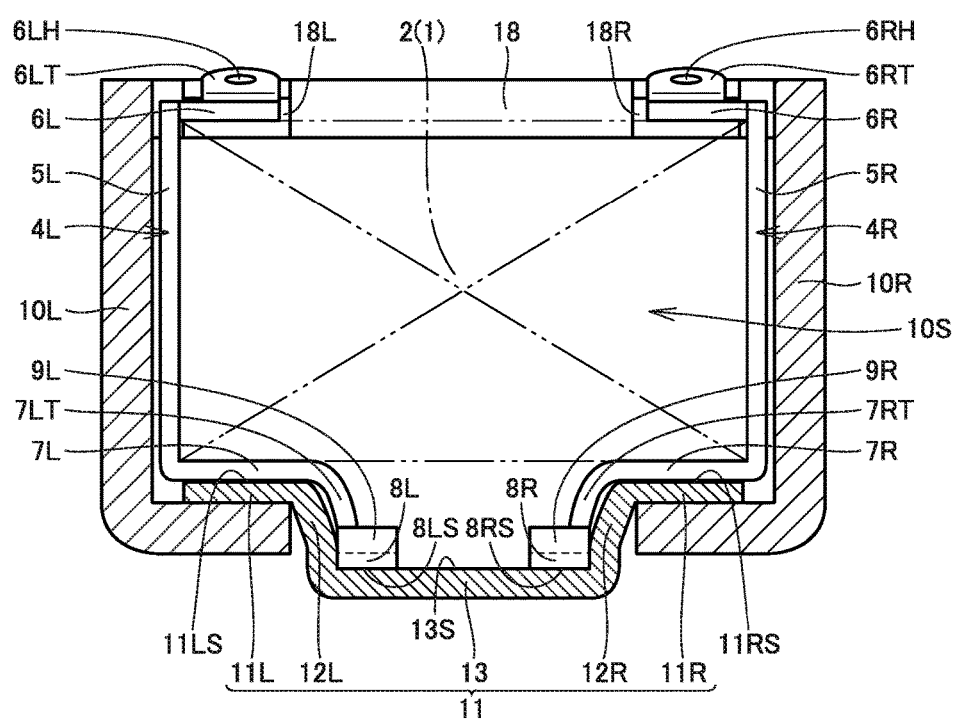
FIG. 3 is a cross-sectional view along the line III-III shown in FIG. 2.

FIG. 2 shows a situation, seen from above, where the installation object 1 is assembled with the receiving portion 10S of the vehicle body 10. FIG. 3 is a cross-sectional view along the line III-III shown in FIG. 2. For the sake of convenience in explanations, the onboard equipment 2 is indicated by double-dotted chain lines and a pair of brackets 4L, 4R (described in detail later) attached to the onboard equipment 2 is indicated by solid lines in FIG. 3.

FIG. 4 is a perspective view, seen from diagonally above in the vehicle compartment, showing a situation where the installation object 1 is assembled with the receiving portion 10S of the vehicle body 10. FIG. 5 is a perspective view for explaining a situation where the brackets 4L, 4R are assembled with the receiving portion 10S. FIG. 5 corresponds to the perspective view of FIG. 4 except that the onboard equipment 2 and the cluster panel 3 are not shown therein.

Installation Object 1

With reference to FIGS. 2 to 5, the installation object 1 is formed of the cluster panel 3 and the onboard equipment 2 integrated with each other, as described above. The onboard equipment 2 is substantially in the shape of a rectangular parallelepiped. On both sides of the onboard equipment 2 in the vehicle width direction, a pair of brackets 4L, 4R is attached, respectively.

Bracket 4L

As shown in FIG. 5, the bracket 4L includes a side wall portion 5L, an upper portion 6L, a fastening portion 6LT, a through hole 6LH, a lower portion 7L, a hanging portion 7LT, a lowermost portion 8L, a sliding contact portion 8LS, and a folded portion 9L (contact portion). The side wall portion 5L is disposed to face a side surface of the onboard equipment 2. The upper portion 6L is provided continuously with the upper end of the side wall portion 5L and is disposed to face the upper surface of the onboard equipment 2.

The fastening portion 6LT is provided continuously with the front (the front in the vehicle front-back direction) of the upper portion 6L. The fastening portion 6LT has the through hole 6LH. Through the through hole 6LH and a through hole 18LH that is provided in the vehicle body 10, a fastener such as a bolt (not shown) is inserted.

The lower portion 7L of the bracket 4L is provided continuously with the lower end of the side wall portion 5L and is disposed to face the lower surface of the onboard equipment 2. The hanging portion 7LT is provided continuously with the inner side (the right side in the vehicle width direction) of the lower portion 7L. The hanging portion 7LT has a shape such that it extends in the direction away from the lower surface of the onboard equipment 2 (substantially downward in the gravity direction).

The lowermost portion 8L is provided continuously with the lower end of the hanging portion 7LT and extends in parallel to the lower surface of the onboard equipment 2 from the lower end of the hanging portion 7LT to the inner side (the right side in the vehicle width direction). The sliding contact portion 8LS is formed of the lower surface of the lowermost portion 8L and has a smooth and flat surface. The folded portion 9L is provided continuously with the near side (the rear side in the vehicle front-back direction) of the lowermost portion 8L. The folded portion 9L is formed into a shape such that the near-side portion of the lowermost portion 8L is folded upward and frontward.

In the present embodiment, the lower portion 7L of the bracket 4L is provided at the front-side part of the lower end of the side wall portion 5L in the vehicle front-back direction (see FIG. 5). In the state where the bracket 4L is attached to the onboard equipment 2, the sliding contact portion 8LS is disposed at the front-side part of the onboard equipment 2 in the vehicle front-back direction. Accordingly, the sliding contact portion 8LS and the folded portion 9L of the bracket 4L are located on the front side, in the vehicle front-back direction, relative to the position of the center of gravity of the onboard equipment 2 (see FIG. 6). The same applies to a sliding contact portion 8RS and a folded portion 9R of the bracket 4R to be subsequently described.

Bracket 4R

The bracket 4R is symmetrical to the bracket 4L in shape with respect to a plane. Specifically, if a virtual plane parallel to the gravity direction and extending in the vehicle front-back direction is given, the brackets 4L, 4R are symmetrical to each other in shape with respect to the virtual plane. The bracket 4R includes a side wall portion 5R, an upper portion 6R, a fastening portion 6RT, a through hole 6RH, a lower portion 7R, a hanging portion 7RT, a lowermost portion 8R, a sliding contact portion 8RS, and a folded portion 9R (contact portion) that correspond to the side wall portion 5L, the upper portion 6L, the fastening portion 6LT, the through hole 6LH, the lower portion 7L, the hanging portion 7LT, the lowermost portion 8L, the sliding contact portion 8LS, and the folded portion 9L, respectively, of the bracket 4L.

Receiving Portion 10S of Vehicle Body 10

The vehicle body 10 includes the receiving portion 10S that can receive the onboard equipment 2 integrated with the cluster panel 3, and a surface 13S (sliding surface) disposed below the receiving portion 10S and extending for a prescribed length from the vehicle interior side to a position on the farther side of the receiving portion 10S. In the present embodiment, the term "a position on the farther side of the receiving portion 10S" refers to the front side in the vehicle front-back direction.

As shown in FIGS. 2 to 5, the receiving portion 10S is a hollow space defined in a shape corresponding to the shape of the onboard equipment 2 (more specifically, the shape of the onboard equipment 2 with the brackets 4L, 4R attached thereto). The receiving portion 10S in the present embodiment is defined by a pair of supporting members 10L, 10R; a receiving member 11; and an upper fixing portion 18 and is provided inside of them.

The supporting member 10L, has a substantially L-shaped cross section, and the supporting member 10R is symmetrical to the supporting member 10L in shape with respect to a plane. If a virtual plane is given similarly to the above, the supporting members 10L, 10R are symmetrical to each other in shape with respect to the virtual plane. The pair of supporting members 10L, 10R is disposed so that the supporting members 10L, 10R face each other with an interval lying therebetween (on opposite sides of the receiving portion 10S). The supporting members 10L, 10R support both-end portions (upper portions 11L, 11R), in the vehicle width direction, of the receiving member 11 from below.

The receiving member 11 in the present embodiment includes: upper portions 11L, 11R; connecting portions 12L, 12R; and a lower portion 13. The upper portions 11L, 11R are each in the form of a plate. The upper portions 11L, 11R have smooth and flat surfaces 11LS, 11RS. As described above, the upper portions 11L, 11R are supported by the supporting members 10L, 10R, respectively.

The connecting portions 12L, 12R are provided continuously with the inner sides of the upper portions 11L, 11R, respectively, to connect the upper portions 11L, 11R to the lower portion 13. The connecting portions 12L, 12R are formed to hang down from the inner parts of the upper portions 11L, 11R, respectively. The connecting portions 12L, 12R each have a shape such that it extends for a prescribed length from the vehicle interior side to a position on the farther side of the receiving portion 10S. The connecting portions 12L, 12R can serve as guiding walls.

As shown in the cross-sectional view of FIG. 3, the inner surface (the surface located on the side where the onboard equipment 2 is disposed) of the connecting portion 12L preferably has an inclined (or curved) surface shape extending diagonally toward the center of the lower portion 13. Similarly, the inner surface of the connecting portion 12R also preferably has an inclined (or curved) surface shape extending diagonally toward the center of the lower portion 13.

The lower portion 13 is in the form of a flat plate and connects the lower end of the connecting portion 12L and the lower end of the connecting portion 12R to each other. The lower portion 13 has a smooth and flat surface 13S. The surface 13S of the lower portion 13 can serve as a sliding surface and has a shape such that it extends for a prescribed length from a position on the vehicle interior side to a position on the farther side of the receiving portion 10S.

Figure 6:
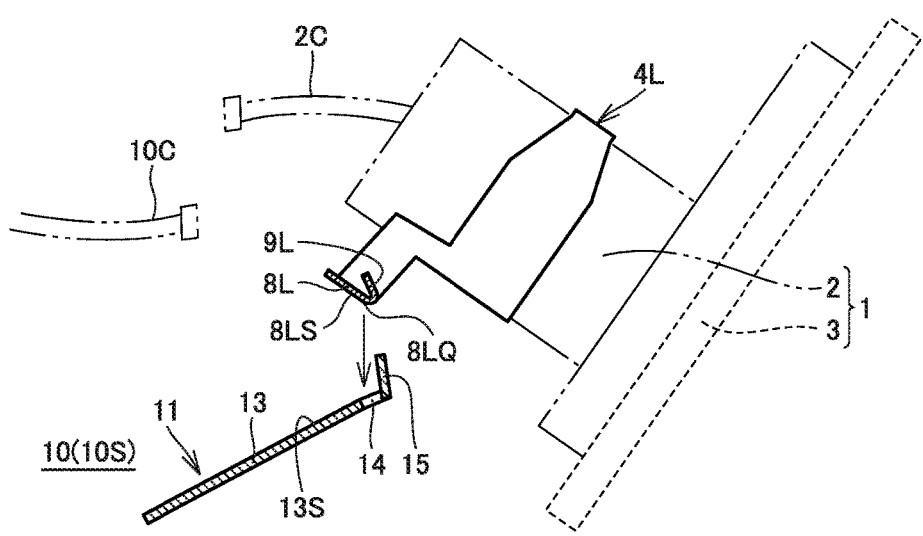
FIG. 6 is a cross-sectional view showing the installation object and a receiving member that is provided below the receiving portion of the vehicle body, FIG. 6 showing the first step of an assembly method regarding the cluster panel integrated with the onboard equipment in the embodiment.

In the present embodiment, the surface 13S (sliding surface) of the lower portion 13 has a shape such that it inclines downward in the gravity direction from the vehicle interior side to the vehicle front side (see FIG. 6). Such a feature is preferable but is not essential for the assembly structure of the cluster panel integrated with the onboard equipment. The surface 13S (sliding surface) of the lower portion 13 may also extend horizontally.

The surface 13S (sliding surface) of the lower portion 13 has a hole portion 14 at its end portion on the vehicle interior side (the end portion on the rear side in the vehicle front-back direction). The hole portion 14 is in the form of a groove extending laterally along the vehicle width direction. The hole portion 14 may pass through the lower portion 13 in its thickness direction or may be a recess having a prescribed depth and provided without passing through the lower portion 13. That is, the hole portion 14 herein is not limited only to the one passing through the lower portion 13 in the thickness direction but is a concept also including the one that does not pass through the lower portion 13 in the thickness direction. For example, as a method of creating the hole portion 14 that does not pass through the lower portion 13 in the thickness direction, a machining process may be performed on a part of the lower portion 13 (a part of the lower portion 13 located on the vehicle interior side) to create the hole portion 14 in the form of a groove having a prescribed recess depth. As another method, a bending process may also be performed on a part of the lower portion 13 to create the hole portion 14. In the case of bending the lower portion 13, a part of the lower portion 13 (a part of the lower portion 13 located on the vehicle interior side) may be bent into, for example, a U, V, W, M, or N shape to create the hole portion 14.

Further, the surface 13S of the lower portion 13 is provided with an upright wall portion 15 at a position on the vehicle interior side (in the present embodiment, a position adjacent to the hole portion 14, on the vehicle interior side relative to the position of the hole portion 14). The upright wall portion 15 extends laterally along the vehicle width direction and has a shape such that it stands upward for a prescribed height from the end portion of the lower portion 13 on the near side. The upright wall portion 15 does not have to be adjacent to the hole portion 14 but may be provided at a position with the surface 13S of the lower portion 13 interposed (i.e., the surface 13S of the lower portion 13 may lie between the upright wall portion 15 and the hole portion 14).

The upper fixing portion 18 connects the upper front portion of the supporting member 10L and the upper front portion of the supporting member 10R to each other. The upper fixing portion 18 is in the shape of a rectangular parallelepiped extending in the vehicle width direction. The upper fixing portion 18 has a pair of retainers 18L, 18R fixed to its near-side surface (the rear-side surface in the vehicle front-back direction). The retainers 18L, 18R are disposed with an interval lying therebetween in the vehicle width direction. The retainers 18L, 18R have through holes 18LH, 18RH, respectively.

As described above, a fastener such as a bolt (not shown) is inserted in the through hole 6LH provided within the installation object 1 and the through hole 18LH provided within the vehicle body 10. Similarly, another fastener such as a bolt (not shown) is inserted in the through hole 6RH provided within the installation object 1 and the through hole 18RH provided within the vehicle body 10. The fastening with the fasteners allows the installation object 1 (the onboard equipment 2 and the cluster panel 3) to be assembled with the vehicle body 10 with the bracket 4L and the bracket 4R.

Assembly Method to Assemble Installation Object 1 with Vehicle Body 10

An assembly method to assemble the installation object 1 with the vehicle body 10 (receiving portion 10S) will be described with reference to FIGS. 6 to 10. FIG. 6 is a cross-sectional view showing the installation object 1 and the receiving member 11 that is provided below the receiving portion 10S of the vehicle body 10, FIG. 6 showing the first step of the assembly method.

As shown in FIG. 6, when the installation object 1 is assembled with the vehicle body 10, first, a worker lifts the installation object 1 and tilts the installation object 1 to the near side (to the rear side in the vehicle front-back direction). In this state, the worker places the near-side end portion 8LQ of the sliding contact portion 8LS of the bracket 4L in the hole portion 14 of the receiving member 11. A similar operation is performed for the bracket 4R although not shown (the same applies to the following).

As described with reference to the cross-sectional view of FIG. 3, the inner surfaces (the surfaces located on the side where the onboard equipment 2 is disposed) of the connecting portions 12L, 12R are inclined, and thus the worker can easily place the sliding contact portions 8LS, 8RS of the brackets 4L, 4R on the surface 13S of the lower portion 13 (on the inner sides of the connecting portions 12L, 12R).

Note that instead of directly placing (inserting) the near-side end portion 8LQ of the sliding contact portion 8LS of the bracket 4L in the hole portion 14, a worker may also use the following method to place the near-side end portion 8LQ of the sliding contact portion 8LS of the bracket 4L in the hole portion 14. First, the worker lifts the installation object 1 and places the sliding contact portion 8LS of the bracket 4L on the surface 13S of the lower portion 13. This operation is also performed for the sliding contact portion 8RS of the bracket 4R simultaneously with the operation for the bracket 4L (the same applies to the following). At this time, the worker may or may not tilt the installation object 1 to the near side (to the rear side in the vehicle front-back direction). The installation object 1 may take an appropriate attitude. The inner surfaces of the connecting portions 12L, 12R (see FIG. 3) are inclined, and thus the worker can easily place the sliding contact portion 8LS of the bracket 4L on the surface 13S of the lower portion 13.

As described above, in the present embodiment, the upright wall portion 15 is provided at the position adjacent to the hole portion 14, on the vehicle interior side relative to the position of the hole portion 14. Further, the folded portion 9L is provided on the near side (the rear side in the vehicle front-back direction) of the lowermost portion 8L of the bracket 4L. The upright wall portion 15 and the folded portion 9L are to face each other. The worker slides the installation object 1 toward the near side while keeping the sliding contact portion 8LS of the bracket 4L in contact with the surface 13S of the lower portion 13, so as to bring the near-side end portion of the sliding contact portion 8LS (folded portion 9L) in contact with the upright wall portion 15. The contact of the near-side end portion 8LQ of the sliding contact portion 8LS with the upright wall portion 15 prevents the installation object 1 (the near-side end portion 8LQ of the sliding contact portion 8LS) from moving apart from the position of the hole portion 14 toward the near side.

The worker rotates the installation object 1 to the near side while keeping the near-side end portion 8LQ of the sliding contact portion 8LS in contact with the upright wall portion 15. As described above, in the present embodiment, the sliding contact portion 8LS of the bracket 4L and the folded portion 9L are located on the front side relative to the position of the center of gravity of the onboard equipment 2 in the vehicle front-back direction (see FIG. 6). The installation object 1's own weight assists the rotation of the installation object 1 to the near side (to the worker's side). Accordingly, the worker can easily rotate the installation object 1 to the near side and further can easily fit the near-side end portion 8LQ of the sliding contact portion 8LS into the hole portion 14 merely by gradually reducing the force that supports the installation object 1 (these actions and effects similarly apply to the bracket 4R). Note that, depending on an attitude of the installation object 1 when it is slid, the near-side end portion 8LQ of the sliding contact portion 8LS may fit into the hole portion 14 without coming in contact with the upright wall portion 15.

Figure 7:
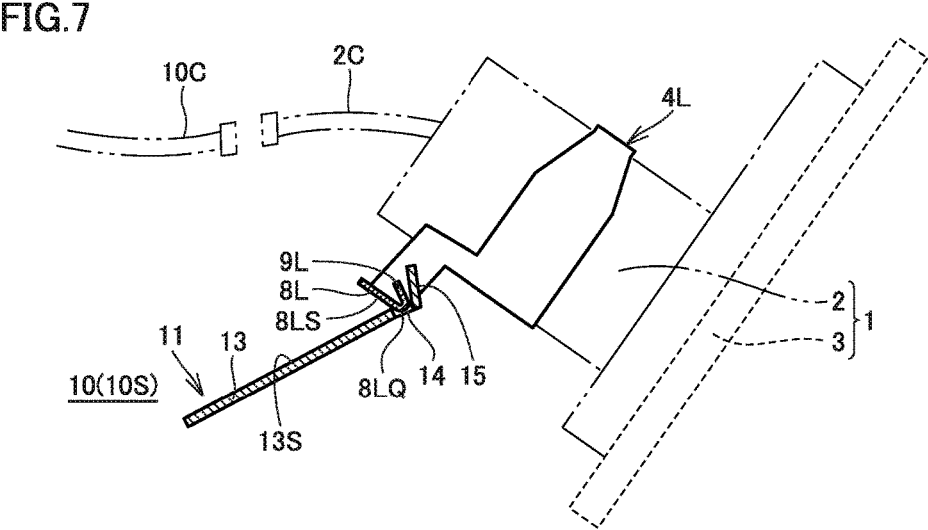
FIG. 7 is a cross-sectional view showing the installation object and the receiving member that is provided below the receiving portion of the vehicle body, FIG. 7 showing the second step of the assembly method regarding the cluster panel integrated with the onboard equipment in the embodiment.

As shown in FIG. 7, the near-side end portion 8LQ of the sliding contact portion 8LS is placed in the hole portion 14, thereby substantially restraining a relative movement of the installation object 1 and the receiving member 11 with respect to each other. The term "relative movement" herein refers to a movement of the installation object 1 when the installation object 1 is actually inserted into (assembled with) the receiving portion 10S or, more specifically, refers to a movement in the vehicle front-back direction, the direction parallel to the surface 13S (sliding surface) of the receiving member 11 (see the direction indicated by the arrow DR in FIG. 10). This movement is substantially restrained by the near-side end portion 8LQ of the sliding contact portion 8LS being placed in the hole portion 14.

The worker further rotates the installation object 1 to the near side while reducing the force that supports the installation object 1. The folded portions 9L, 9R of the brackets 4L, 4R come in contact with the upright wall portion 15, thereby stopping the rotation of the installation object 1. After the folded portions 9L, 9R of the brackets 4L, 4R come in contact with the upright wall portion 15, the near-side end portions of the sliding contact portions 8LS, 8RS fit into the hole portion 14, whereby the attitude of the installation object 1 is maintained. The attitude of the installation object 1 is provisionally held by the brackets 4L, 4R being fitted in the hole portion 14. The provisional holding restrains not only a frontward movement of the installation object 1 in the vehicle front-back direction but also a rearward rotation of the installation object 1 in the vehicle front-back direction. Accordingly, if the worker releases his/her supporting one hand or both hands from the installation object 1, the installation object 1 hardly moves. The worker connects a wire 2C of the installation object 1 and a wire 10C of the vehicle body 10 to each other in the state where the entire installation object 1 is provisionally held by the receiving member 11. The worker can easily perform the connection operation.

Figure 8:
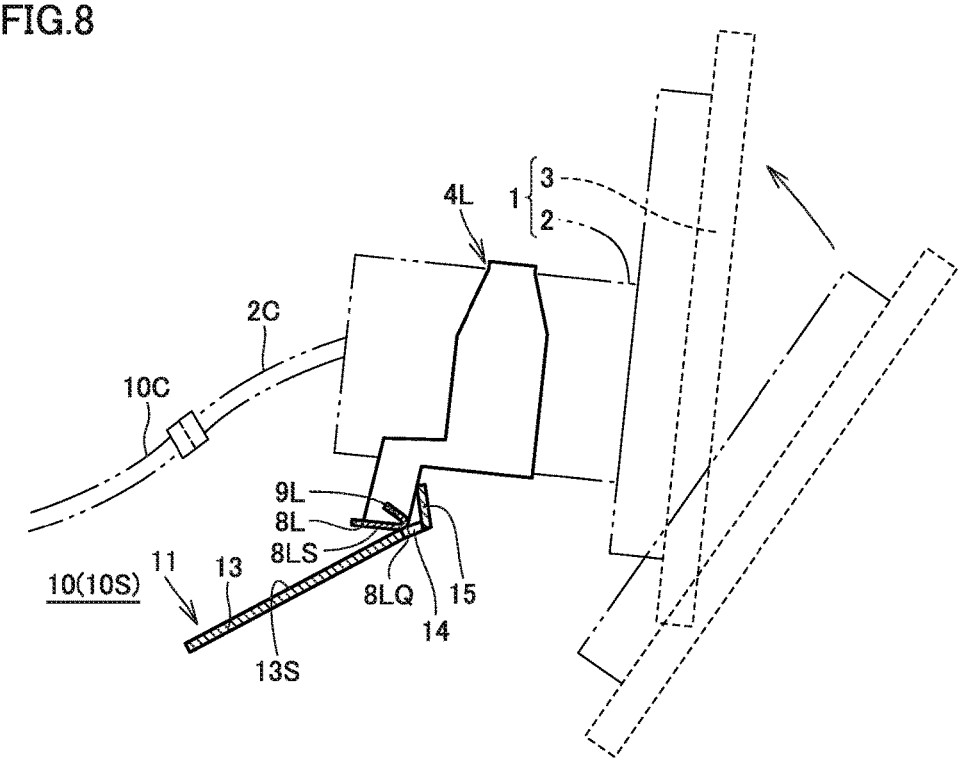
FIG. 8 is a cross-sectional view showing the installation object and the receiving member that is provided below the receiving portion of the vehicle body, FIG. 8 showing the third step of the assembly method regarding the cluster panel integrated with the onboard equipment in the embodiment.

With reference to FIG. 8, in the present embodiment, the installation object 1 (the onboard equipment 2 integrated with the cluster panel 3) is rotatable to the vehicle front side and the vehicle rear side around the position of the sliding contact portion 8LS as the center (more specifically, around the near-side end portion 8LQ of the sliding contact portion 8LS as the center) in the state where the near-side end portion 8LQ of the sliding contact portion 8LS is placed in the hole portion 14. After the connection operation, the worker rotates the entire installation object 1 to the farther side of the receiving portion 10S in such a manner as to rise up the upper part of the installation object 1.

Figure 9:
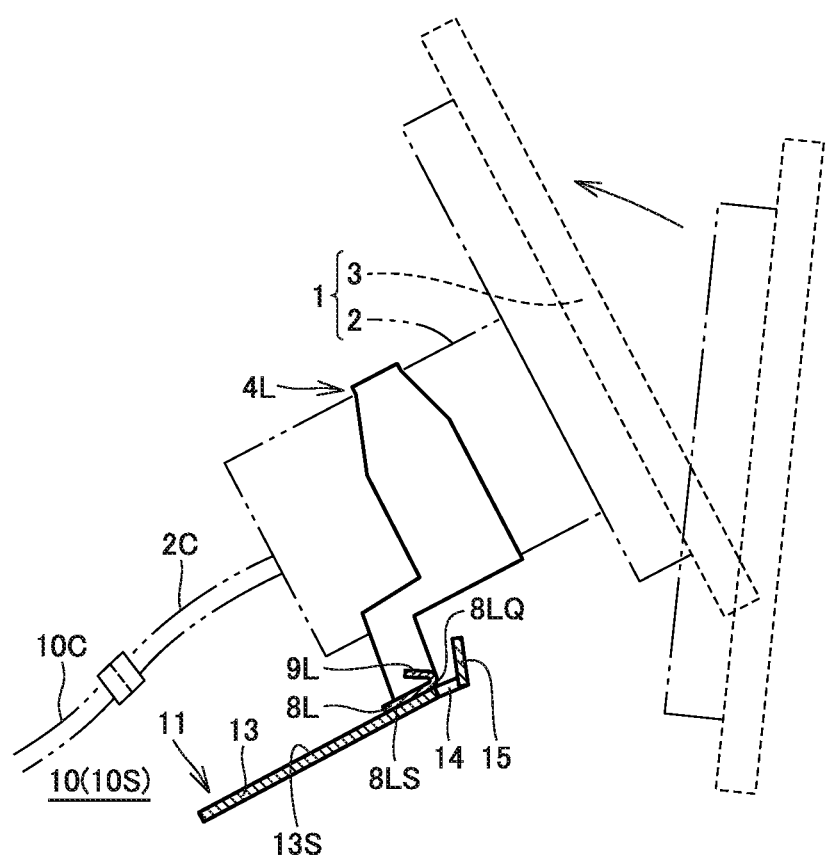
FIG. 9 is a cross-sectional view showing the installation object and the receiving member that is provided below the receiving portion of the vehicle body, FIG. 9 showing the fourth step of the assembly method regarding the cluster panel integrated with the onboard equipment in the embodiment.

With reference to FIG. 9, the worker further rotates the entire installation object 1, thereby releasing the near-side end portion 8LQ of the sliding contact portion 8LS from the hole portion 14. In the present embodiment, the surface 13S (sliding surface) of the lower portion 13 has the shape such that it is inclined downward in the gravity direction from the vehicle interior side to the vehicle front side. Accordingly, a force to slide the installation object 1 toward the vehicle front side along the surface 13S of the lower portion 13 is exerted on the installation object 1.

Figure 10:
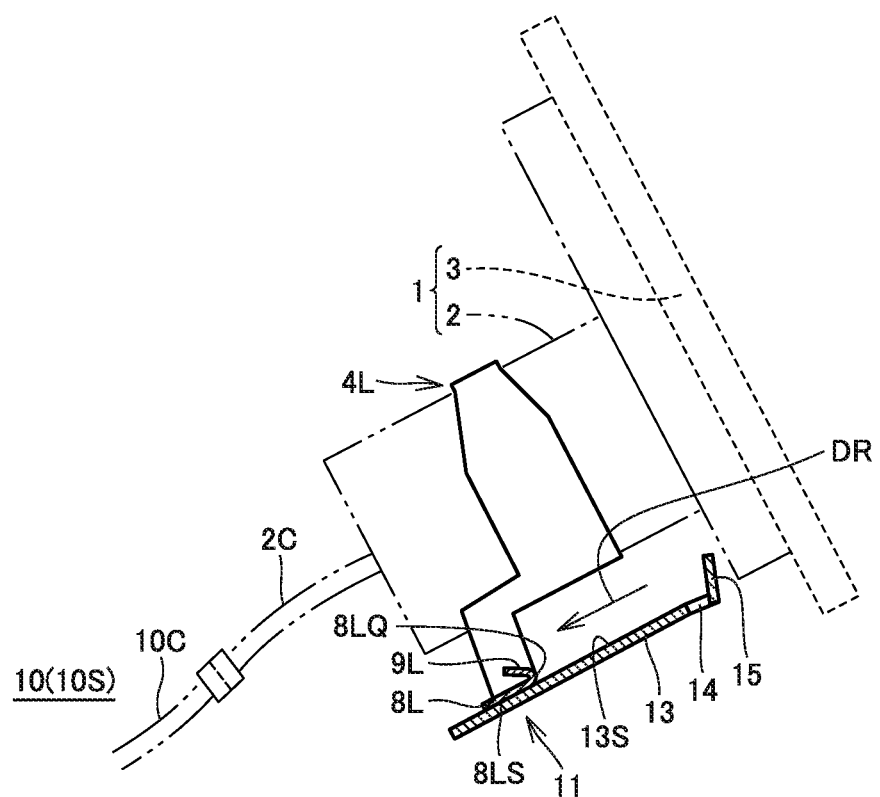
FIG. 10 is a cross-sectional view showing the installation object and the receiving member that is provided below the receiving portion of the vehicle body, FIG. 10 showing the fifth step of the assembly method regarding the cluster panel integrated with the onboard equipment in the embodiment.

With reference to FIG. 10, the worker slides the entire installation object 1 to the farther side (to the vehicle front side) of the receiving portion 10S with the assistance of the force exerted on the installation object 1. The brackets 4L, 4R in the present embodiment are provided with the sliding contact portions 8LS, 8RS, and the sliding contact portions 8LS, 8RS are in sliding contact with the surface 13S (sliding surface) of the lower portion 13 when the installation object 1 (the onboard equipment 2 integrated with the cluster panel 3) is put into and taken out from the receiving portion 10S. Accordingly, the worker can easily assemble the installation object 1 with the receiving portion 10S of the vehicle body 10 and can also easily remove the installation object 1 from the receiving portion 10S of the vehicle body 10 with the guidance of the surface 13S (sliding surface) of the lower portion 13.

As described at the beginning, regarding the cluster panel 3 disposed in the front part in the vehicle compartment, the improvement in design can be achieved by forming the cluster panel 3 with no parting line (component parting line) and by making the cluster panel 3 as large as possible. In a case where a large cluster panel 3 that is integrated with onboard equipment 2 is integrally assembled with a vehicle body 10, however, the assembly process may become difficult due to the large size and weight of the installation object 1, if no countermeasure is taken.

In contrast, in the present embodiment, the worker can easily assemble the installation object 1 with the receiving portion 10S of the vehicle body 10 and can also easily remove the installation object 1 from the receiving portion 10S of the vehicle body 10 with the guidance of the surface 13S (sliding surface) of the lower portion 13, as described above.

As described above, the receiving member 11 in the present embodiment includes the connecting portions 12L, 12R. The connecting portions 12L, 12R connect the upper portions 11L, 11R and the lower portion 13 to each other. When the installation object 1 (the onboard equipment 2 integrated with the cluster panel 3) is put into and taken out from the receiving portion 10S, the connecting portions 12L, 12R come in contact with the sliding contact portions 8LS, 8RS from the outer sides. The connecting portions 12L, 12R can serve as guiding walls that restrain a movement in the vehicle width direction of the sliding contact portions 8LS, 8RS that move on the surface 13S (sliding surface) of the lower portion 13. The guidance of the guiding walls allows the worker to assemble and remove the installation object 1 with and from the receiving portion 10S of the vehicle body 10 more easily.

Modification

Figure 11:
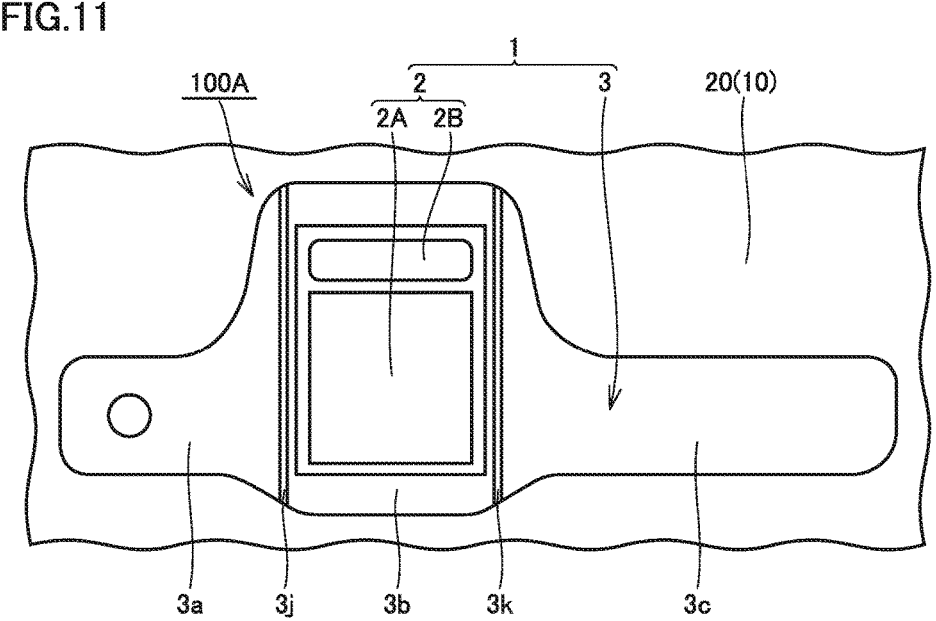
FIG. 11 shows the appearance of an assembly structure of a cluster panel integrated with onboard equipment, seen from the front, in a modification of the embodiment.

In an assembly structure 100A of a cluster panel integrated with onboard equipment shown in FIG. 11, a cluster panel 3 is divided into three panels 3a, 3b, and 3c. A parting line 3j is provided between the panels 3a and 3b, and a parting line 3k is provided between the panels 3b and 3c. These features present an aesthetic appearance different from that of the above embodiment in terms of design. With such features, being equipped with the structure similar to that of the above embodiment allows a worker to easily assemble an installation object 1 (onboard equipment 2 integrated with a cluster panel 3) with a receiving portion 10S of a vehicle body 10 and to easily remove the installation object 1 from the receiving portion 10S of the vehicle body 10 with the guidance of a surface 13S (sliding surface) of a lower portion 13 when the installation object 1 is put into and taken out from the receiving portion 10S.

Though the embodiment of the present invention has been described, it should be understood that the embodiment disclosed herein is for the purpose of illustration only and non-restrictive in any respect. The scope of the present invention is defined by the terms of the claims and is intended to include any modification within the meaning and scope equivalent to the terms of the claims.

What is claimed is:

1. An assembly structure for assembling a cluster panel with a vehicle body, the cluster panel being integrated with onboard equipment,
the vehicle body comprising:
a receiving portion that can receive the onboard equipment integrated with the cluster panel; and
a sliding surface disposed below the receiving portion, the sliding surface extending for a prescribed length from a position on a vehicle interior side to a position on a farther side of the receiving portion, and
the onboard equipment comprising:
a sliding contact portion that can come in sliding contact with the sliding surface when the onboard equipment integrated with the cluster panel is put into and taken out from the receiving portion, wherein
the sliding surface has a hole portion that can receive the sliding contact portion, the hole portion being disposed at a position on the vehicle interior side, and
the onboard equipment integrated with the cluster panel is rotatable to a vehicle front side and a vehicle rear side around a position of the sliding contact portion as a center in a state where the sliding contact portion is placed in the hole portion.

2. The assembly structure according to claim 1, wherein the sliding surface has a shape such that the sliding surface is inclined downward in a gravity direction from the vehicle interior side to a vehicle front side.

3. The assembly structure according to claim 1, wherein the sliding surface is provided with an upright wall portion at a position on the vehicle interior side relative to a position of the hole portion, the upright wall portion restraining a movement of the sliding contact portion to the vehicle interior side.

4. The assembly structure according to claim 3, wherein
the onboard equipment includes a contact portion that can be in contact with the upright wall portion in a state where the sliding contact portion is placed in the hole portion, and
the contact portion in contact with the upright wall portion restrains a rotation of the onboard equipment to the vehicle rear side in a state where the sliding contact portion is placed in the hole portion.

5. The assembly structure according to claim 1, wherein
the vehicle body includes a pair of guiding walls extending for a prescribed length from the vehicle interior side to a position on the farther side of the receiving portion, and
the pair of guiding walls restrains a movement of the sliding contact portion in a vehicle width direction by coming in contact with the sliding contact portion, the sliding contact portion moving on the sliding surface.

* * * * *